UNITED STATES PATENT OFFICE.

CHARLES A. SCHAEFFER, OF ITHACA, NEW YORK.

PROCESS OF EXTRACTING GOLD AND SILVER FROM THEIR ORES.

SPECIFICATION forming part of Letters Patent No. 267,723, dated November 21, 1882.

Application filed June 28, 1880. (No specimens.)

*To all whom it may concern:*

Be it known that I, CHARLES A. SCHAEFFER, of Ithaca, in the county of Tompkins and State of New York, have invented a new and valuable Improvement in the Process of Extracting Gold and Silver from Their Ores; and I do hereby declare that the following is a full, clear, and exact description thereof, which will enable others skilled in the art to which it pertains to make and use the same.

The object of this invention is to extract the gold and silver, as also the copper, where this metal is present, from the refractory ores known as "sulphurets," which cannot be adequately worked by the amalgamation process, and which, from absence of a sufficient quantity of lead ores, cannot be successfully smelted.

The method of carrying out the process is as follows: The ore, having been reduced to the state of a fine powder by stamping or grinding, may be treated raw; but I prefer, in most cases, to subject it to the operation of roasting. The raw ore or the roasted product is first placed in stationary vats or in revolving barrels, and water added in sufficient quantity to cover the powdered ore to the depth of several inches. Where the vats are stationary, a mechanical stirrer may be used with advantage. Bromine is next added to the contents of the vat or barrel to the amount of three ounces avoirdupois for each troy ounce of precious metal contained in the ore, and the whole mixture occasionally agitated. After the lapse of twenty-four hours the gold will be found to be entirely dissolved by the water in the form of the bromide, while the sulphide or other compound of silver present will be converted into the bromide of silver, but will remain undissolved by the water. After filtering off the aqueous solution and thoroughly washing with hot water, the gold may be precipitated in the metallic form, either by oxalic acid or by sulphate of iron, as is commonly practiced in the so-called "chlorination" method. The residue, after removal of the gold solution, is next treated with the sodic or calcic hyposulphite, either of which effects the solution of the bromide of silver. This solution is then filtered off, the residue thoroughly washed with water, and from the liquid thus obtained the silver may be precipitated as the sulphide by the addition of calcic sulphide. From the sulphide of silver the metal may be obtained by any of the processes usually adopted in the working of that metal.

In cases where copper pyrites or any sulphide of copper is present in the ore, if it is desired to extract that metal also, the ore must be roasted, and for each pound of copper contained one pound of sulphuric acid is added at the time of the addition of the bromine, as above described. In such case, after the precipitation and removal of the metallic gold by decantation or filtration, the metallic copper can be completely precipitated from the filtrate by means of scrap iron.

Having described my invention, what I claim is—

1. In obtaining gold from its ores, the process of extracting the gold from the base or earthy matters with which it is associated in the ore, which said process consists in subjecting the ore, whether raw or roasted, to the action of bromine, substantially as set forth, and thereafter separating the gold from the resultant bromide solution by aid of a suitable precipitant, substantially as described.

2. In obtaining the precious metals from their ores, the process of extracting the gold and silver from the base or earthy matters with which they are associated in the ore, which said process consists in subjecting the dampened ore, whether raw or roasted, to the action of bromine, substantially as set forth, separating the gold, by aid of a suitable precipitant, from the resulting bromide solution, and the silver from the resulting pulp by aid of hyposulphite or like salt, which shall dissolve the argentic bromide and remove it from the base pulp for subsequent treatment, substantially as described.

In testimony whereof I have hereunto set my hand this 25th day of June, 1880.

CHARLES A. SCHAEFFER.

Witnesses:
 M. VAN CLEY,
 S. H. WILCOX.